UNITED STATES PATENT OFFICE.

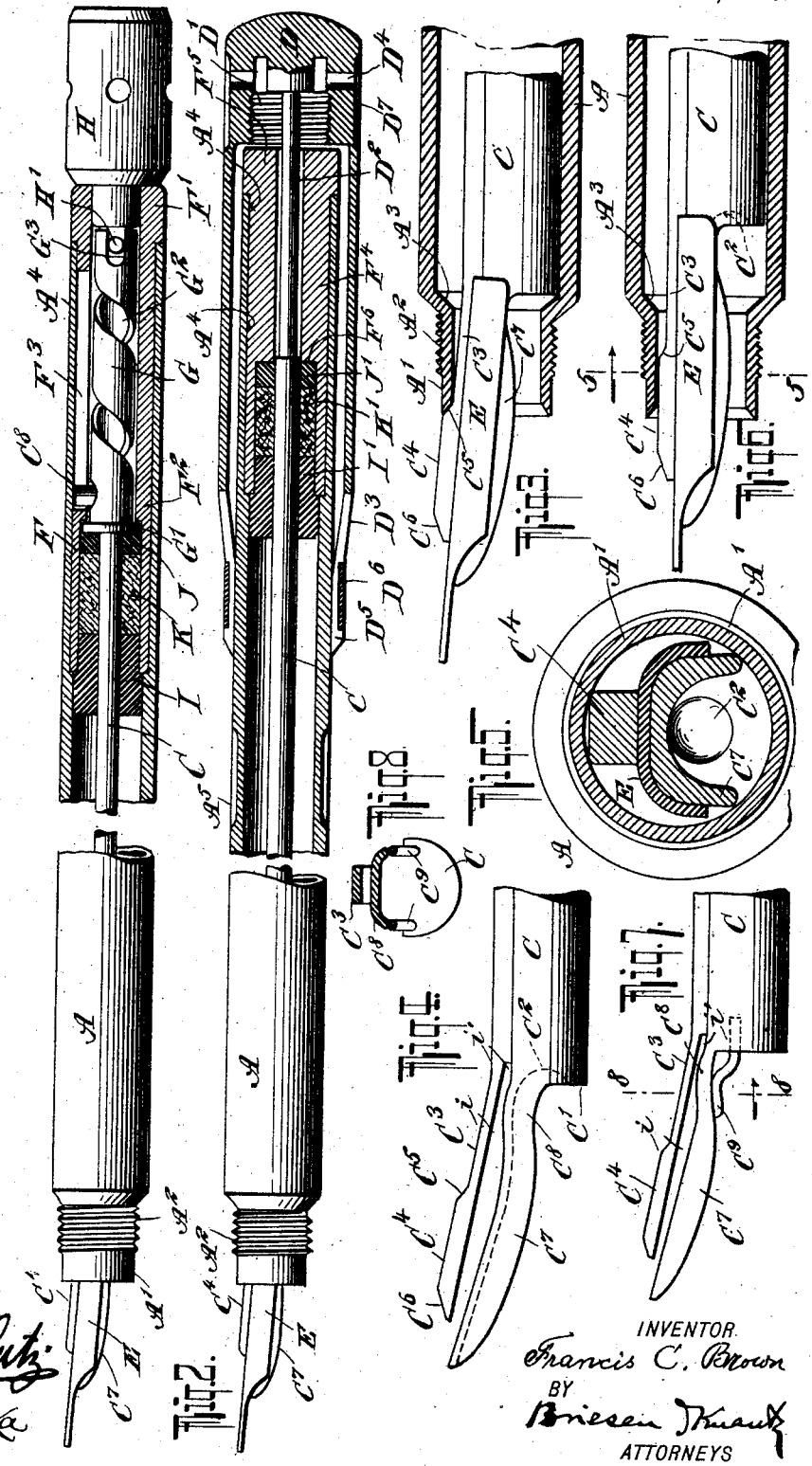

FRANCIS C. BROWN, OF NEW BRIGHTON, NEW YORK.

FOUNTAIN-PEN.

No. 901,948.      Specification of Letters Patent.      Patented Oct. 27, 1908.

Application filed January 3, 1907. Serial No. 350,630.

*To all whom it may concern:*

Be it known that I, FRANCIS C. BROWN, a citizen of the United States, and a resident of New Brighton, Staten Island, in the borough and county of Richmond, city and State of New York, have invented certain new and useful Improvements in Fountain-Pens, of which the following is a specification.

My invention relates to fountain pens and has for its object to provide an efficient packing at the rear of the ink chamber through which projects the feed bar for governing the position of the nib.

Another object of my invention is to improve the construction of the nib holder so as to simplify it and also to cause it to hug the barrel tightly so as to prevent accidental movement of the nib and feed bar.

In the accompanying drawings I have illustrated two main forms of my invention, Figure 1 being partly longitudinal section and partly an outside view of one form; Fig. 2 being a similar view of the other form; Fig. 3 a longitudinal section of the forward end of the barrel with the feed bar and nib; Fig. 4 is a separate view of the forward end of the feed bar as it appears when removed from the barrel; Fig. 5 is a cross section on line 5—5 of Fig. 6; Fig. 6 is a view similar to Fig. 3, but showing the parts in a different position; Fig. 7 is a view similar to Fig. 4, showing a slightly different construction; and Fig. 8 is a cross section on line 8—8 of Fig. 7.

The construction shown in Figs. 1 and 2 differ from each other only in the means employed for operating the feed bar and also in details of the joint at the rear of the ink chamber. The forward portion of the fountain pen is the same in both constructions. The barrel A has a reduced forward end $A'$ with a screw-thread $A^2$ and an interior shoulder $A^3$. This screw-thread is adapted to be engaged by a mating screw-thread in the cap. The cap forms part of the mechanism for moving the feed bar. The construction of the cap in Fig. 1 differs from that in Fig. 2. In the latter figure, the cap is designated as D and has a screw-thread $D'$ to fit the screw thread $A^2$.

The feed bar C extends centrally within the barrel and has a shoulder $C'$ at its forward end. The forward end of the feed bar carries or is formed with two feed tongues adapted to receive the nib E between them. The upper feed tongue $C^3$ is preferably thickened as indicated at $C^4$ and formed with a beveled shoulder $C^5$ arranged to be outside the barrel at the time the pen is in the writing position. The front end of the thickened portion $C^4$ is preferably beveled as indicated at $C^6$. The lower tongue $C^7$ is bent as shown in Fig. 4, having a sharp angle $C^8$ adjacent to its attached end. The lower tongue is slightly spaced from the nib E at all times, allowing ink to gather under the nib. The faces of the tongues $C^3$ and $C^7$ between which the nib is received may be smooth, capillary action being sufficient to feed the ink. When the tongues $C^3$, $C^7$ are not under a strain, that is, when the feed bar is removed entirely from the pen, they will assume a position at an angle to the axis of the feed bar as shown in Fig. 4.

The elasticity of the parts is sufficient to allow them to take the writing position shown in Figs. 1, 2 and 3, or even an alining position, see Fig. 6, but the feed tongues are under tension when the pen is assembled and always tend to take the angular position shown in Fig. 4. The lower tongue is preferably arched (see Fig. 5) to enable it to keep its bent position without making it unnecessarily heavy. If the feed bar C should be drawn backward from the position shown in Fig. 3, the inclined shoulder $C^5$, working in conjunction with the front end of the barrel, will cause the forward end of the feed bar to swing slightly downward (Fig. 6) this movement serving to give a greater clearance for the passage of air into the barrel on either side of the upper tongue $C^3$, to prevent the slopping of ink. After the thickened portion $C^4$ of the upper tongue $C^3$ has been withdrawn beyond the reduced portion $A'$ of the barrel, the elasticity of the feed tongues which so far has thrown the body of the feed bar against the barrel on the side opposite to the nib E, will cause the nib-carrying end of the feed bar to snap upward and to stand at a slight angle to the body of the feed bar. Similarly when the feed bar is moved forward to its projected position the shoulder $C^6$ will first engage the beveled inner shoulder $A^3$ of the barrel, thus gradually bringing the nib portion of the feed bar into alinement with the body portion thereof (Fig. 6). Finally, the shoulder $C^5$ will clear the forward end of the barrel causing the forward end of the feed bar to snap slightly upward, thus reducing the clearance between the nozzle of the barrel and the nib, so as to prevent too liberal a supply of air which would result in too copious a flow of ink. It will be seen that the shoulder $C^5$ will oppose some resistance to the backward movement of the feed bar when in the writing position, so that an accidental movement in this direction is prevented. Such accidental movement is further prevented by the fact that the elastic tension under which the upper feed tongue $C^3$ is held, produces an increased amount of friction between said feed tongue and the inner surface of the reduced barrel portion $A'$. The spring tension also causes the nib to be held tightly between the feed tongues, even when it is retracted.

The means for moving the feed bar and for producing an ink-tight joint at the rear of the ink chamber, is constructed as follows in the form of my invention illustrated by Fig. 1: The rear portion $A^4$ of the barrel is reduced in thickness so as to form an internal shoulder against which is fitted ink-tight the forward end of a sleeve F, the rear end $F'$ of which extends beyond the barrel and may be enlarged so as to be flush therewith. In the particular construction shown, the sleeve is held within the rear portion of the barrel by friction and is provided with an internal shoulder $F^2$ facing forwardly against which is placed a flange $G'$ at the forward end of the rotary actuating member G having a spiral slot $G^2$. Into this spiral slot projects a pin $C^8$ secured to the rear end of the feed bar C and also extending into a longitudinal groove or slot $F^3$ of the sleeve F. The rear end of the rotary actuating member G is provided with longitudinal slots $G^3$ into which is adapted to project a transverse pin $H'$ on the closed end of the cap H. By inserting this end of the cap into the sleeve F as shown in Fig. 1, so that the pin $H'$ will be within the slots $G^3$, and then turning the cap H, the feed member G can be turned so as to cause the feed bar C to slide forward or backward. In its general lines this actuating mechanism has been described in prior patents of mine. Into the forward end of the sleeve F is fitted a plug I which also extends beyond said forward end so as to allow the projecting portion to be grasped when it is desired to remove the plug from the sleeve. This plug is perforated for the passage of the feed bar and the space within the sleeve F between the plug I and the forward flange $G'$ of the rotary actuating member G is filled by a hard rubber washer J adapted to engage the said flange $G'$ and suitable packing material K, for instance a cork tube.

In the form of construction illustrated by Fig. 2, the cap D has an interior central push pin $D^2$ adapted to engage the rear end of the feed bar C, as shown, when the cap is placed on the rear end of the barrel, or when the cap is placed on the forward end of the barrel said push pin will engage a suitable socket or abutment $C^2$ on the nib end of the feed bar. The arched form of the lower tongue $C^7$ (see Fig. 5) also enables the push pin $D^2$ to pass on the side of the nib, and the fact that the nib in the writing position stands at an angle or backward tilt (Fig. 3), gives increased surety of passing the pin on the proper side of the nib, that is, the under side thereof. The feed bar can thus be pushed in or out through the medium of the cap. The cap has suitable ventilating openings $D^3$ and $D^4$ and elastic mouth $D^5$ contracted by a clamping ring $D^6$. I do not, however, claim in this application either the specific construction of this cap or the broad features of construction involved in the actuating mechanism, since these features are claimed in other patents and applications of mine.

The construction of the barrel in the second form of my invention is similar to that first described, that is, the barrel has an enlarged bore $A^4$ which receives the sleeve $F^4$, the rear portion $F^5$ of which projects from the barrel. The forward end of the sleeve $F^4$ abuts against the shoulder in the barrel and is chambered to form a shoulder $F^6$ against which lies a hard rubber disk $J'$ followed by packing material $K'$ and a plug $I'$, which parts are arranged exactly like the corresponding parts of Fig. 1, with the exception that the rear face of the packing disk $J'$ is in direct engagement with the shoulder $F^6$ of the sleeve $F^4$.

By means of the joint or packing above described, I obtain in each construction a tight joint at the rear wall of the ink chamber, where the feed bar passes through said wall.

Both the barrel and the cap may be provided with longitudinal grooves $A^5$, $D^7$ respectively, for the purpose of allowing these parts to be grasped firmly when screwing and unscrewing the cap, and preferably the edges of the grooves should be sharp so as to prevent the fingers from slipping.

The packing K or $K'$ is held under compression between the plug I or $I'$ and the washer J or $J'$.

The forward movement of the feed bar may be limited by the engagement of the shoulder $C'$ with the shoulder $A^3$, as indicated in Fig. 3.

The stiffening of the lower feed tongue adjacent to its base may be obtained in other ways; for instance, in Figs. 7 and 8, stiffening prongs $C^9$ of steel or other material are secured in the body of the feed bar and bear against the lower surface of the arched lower tongue. The hump $C^8$ also causes the upper and lower tongues to approach each other closely at a point intermediate between their ends, and thus forms ink-holding cavities $i, i'$ beneath the nib E both in advance and in the rear of said point, as will be understood by looking at Figs. 4 and 7.

I claim as my invention:

1. In a fountain pen, the combination of the barrel, the sleeve extending within the rear portion of the barrel, the perforated plug located partly within the forward end of the sleeve and partly in front thereof, the nib-carrying feed bar movable through the said plug, and means for advancing and retracting the feed bar.

2. In a fountain pen, the combination of the barrel, the sleeve extending within the rear portion of the barrel, the perforated plug for closing the forward end of the sleeve, the nib-carrying feed bar movable through the said plug, and means for advancing and retracting the feed bar.

3. In a fountain pen, the combination of the barrel, the sleeve extending within the rear portion of the barrel, the perforated plug for closing one end of the sleeve, the nib-carrying feed bar movable through the said plug, and means for advancing and retracting the feed bar.

4. In a fountain pen, the combination of the barrel, the sleeve extending within the rear portion of the barrel, said sleeve being chambered at one end, the tubular packing contained in the chamber of the sleeve, the nib-carrying feed bar movable through the sleeve and packing, and means for advancing and retracting the feed bar.

5. In a fountain pen, the combination of the barrel, the sleeve extending within the rear portion of the barrel and chambered at one end, the tubular packing contained in the chamber of the sleeve, means engaging the ends of the packing to hold it against lengthwise movement, and means for advancing and retracting the feed bar.

6. In a fountain pen, the combination of the barrel, the sleeve extending within the rear portion of the barrel and chambered at one end, a plug fitted within the chambered end of the sleeve, a tubular packing also located in the chamber of the sleeve and held under compression by said plug, and means for advancing and retracting the feed bar.

7. In a fountain pen, the combination of the barrel, the feed bar mounted to slide lengthwise within the barrel, said feed bar having a nib-carrying portion which in the writing position forms an angle with the body of the feed bar, and also having an abutment adjacent to the rear end of said nib-carrying portion, and a cap adapted to fit on the barrel and provided with a push pin to engage said abutment.

8. In a fountain pen, the combination of the barrel, the feed bar movable lengthwise within the barrel and provided with a nib-carrying portion having a tendency to stand at an angle to the body of the feed bar, and means for advancing and retracting the feed bar.

9. In a fountain pen, the combination of the barrel, the feed bar movable lengthwise of the barrel and provided with a nib-carrying portion capable of moving transversely of the feed bar body, means for advancing and retracting the feed bar, and guiding means on the barrel for causing the nib-carrying portion, when in the writing position, to stand at an angle to the body of the feed bar.

10. In a fountain pen, the combination of the barrel having a nozzle and the feed bar provided with a nib-carrying portion comprising elastic upper and lower tongues, of which the latter is provided with a sharp bend or hump adjacent to its base.

11. In a fountain pen, the combination of the barrel having a nozzle and the feed bar provided with a nib-carrying portion having an elastic tongue integral therewith and adapted to engage the nib from below and provided with a sharp bend or hump adjacent to its base.

12. In a fountain pen, a feed bar having a nib-carrying portion with upper and lower feed tongues the opposing surfaces of which approach closely at a point intermediate between their ends, so as to form ink-holding cavities both in advance and in the rear of said point.

13. In a fountain pen, a barrel, a feed bar movable within the same and provided with an upper and a lower feed tongue, and with an abutment adjacent to the base of the lower feed tongue, the latter being arched transversely, and a cap having a push-pin arranged to lie within the arch or concavity of the lower feed tongue and to engage said abutment.

14. In a fountain pen, a feed bar provided with upper and lower feed tongues adapted to receive the nib between them, the lower tongue being arched transversely to form a longitudinal groove in its lower surface.

15. In a fountain pen, a barrel, a feed bar movable within the same and provided with a nib-carrier comprising elastic upper and lower feed tongues, the upper one of which has a thickened forward portion to throw the nib-carrier downward when the pen is being withdrawn from the writing position.

16. In a fountain pen, a barrel having a reduced forward end, a feed bar movable within the barrel and provided with a nib-carrier comprising elastic upper and lower feed tongues, the upper one of which has a thickened forward portion beveled at both ends and coöperating with the forward end of the barrel to throw the nib-carrier downward when the pen is approaching, or receding from, the writing position.

17. In a fountain pen, the combination of the barrel, the sleeve extending within the rear portion of the barrel and chambered at one end, the tubular packing located in the chamber of the sleeve, the plug engaging one end of said packing, the washer engaging the other end of the packing, the nib-carrying feed bar movable through the sleeve, plug, washer and packing, and means for advancing and retracting the feed bar.

18. In a fountain-pen, the combination of the barrel and the feed-bar having a nib-carrying portion, provided with an elastic tongue adapted to engage the nib from below, and prongs carried by the feed bar in engagement with the tongue for stiffening said tongue adjacent to its base.

19. In a fountain pen, the combination of the barrel and the feed bar having a nib-carrying portion provided with elastic upper and lower tongues, of which the latter is stiffened adjacent to its base.

20. In a fountain pen, a feed bar provided with a feed tongue adapted to engage the nib from below and arched transversely to form a longitudinal groove in its lower surface.

In testimony whereof, I have hereunto signed my name in the presence of two subscribing witnesses.

FRANCIS C. BROWN.

Witnesses:
JOHN LOTKA,
JOHN A. KEHLENBECK.